May 18, 1937.　　　L. L. LASSITER　　　2,080,865
ATTACHMENT FOR SERVING TRAYS
Filed Aug. 20, 1936
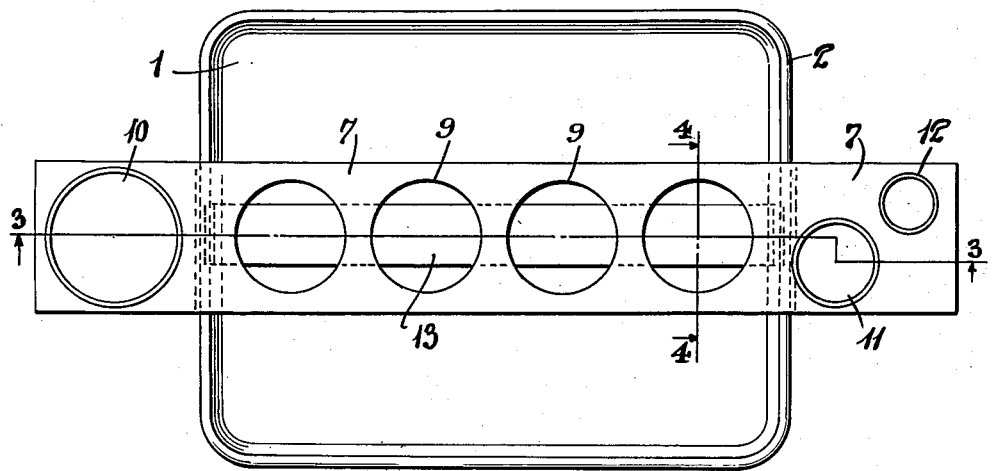
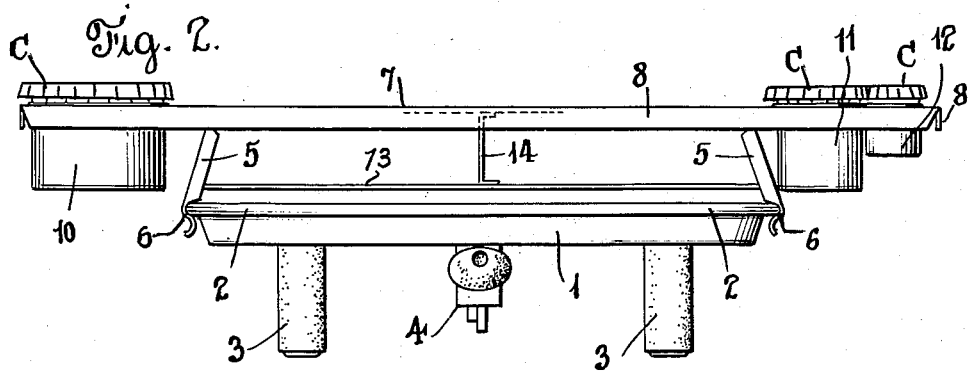
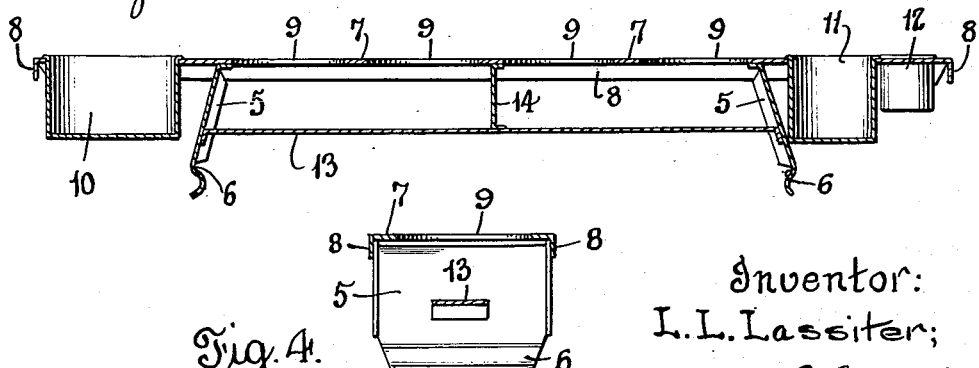
Inventor:
L. L. Lassiter;
by Lester L. Sargent
Attorney Patented May 18, 1937

2,080,865

UNITED STATES PATENT OFFICE 2,080,865

ATTACHMENT FOR SERVING TRAYS

Lemuel L. Lassiter, Charlotte, N. C.

Application August 20, 1936, Serial No. 97,075

1 Claim. (Cl. 211—74)

The object of my invention is to provide a novel attachment for serving trays of the type used for serving customers in automobiles and which can be readily attached and detached from the standard tray; to provide in such an attachment places to hold bottles, glasses, salt, pretzels, mustard, barbecue sauce or the like. I attain the object of my invention by the mechanism illustrated in the accompanying drawing, in which:

Figure 1 is a top plan view of the invention;

Fig. 2 is a side elevation of the same;

Fig. 3 is a longitudinal section on line 3—3 of Fig. 1;

Fig. 4 is a transverse section on line 4—4 of Fig. 1.

Like numerals designate like parts in each of the several views.

Referring to the accompanying drawing, there is illustrated a standard type of tray 1 used for automobile curb service, having the usual dependent fixed arms 3 preferably rubber covered as shown adjacent one edge of the tray and adapted to engage over the window ledge of the automobile, and having the pivoted depending arm 4 preferably having a rubber tip as shown to engage against the outside wall of the automobile to support the tray in a horizontal position adjacent the window of the automobile.

My invention consists of an attachment removably mounted on a standard tray of the type above described. It has a table 7, to which are affixed depending, outwardly slanting legs 5, which are provided with recessed portions 6 to engage the rim 2 of the tray, the ends of the legs being curved outwardly beyond the recessed portions as shown in Figs. 2 and 3 of the drawing, whereby the legs may be easily snapped over the rim of the tray. The table 7 is provided with down-turned edges or flanges 8. Table 7 also has a series of openings 9 suitably spaced to hold glasses or bottles. It also has a large opening at one end in which a suitable container 10 for pretzels, mustard, catsup or the like is carried. At the other end, the table 7 has a smaller container 11 for a condiment such as barbecue sauce or mustard and another container 12 for salt or other condiments.

The sub-base 13 extends between and is affixed to the depending arms 5 to brace them and also to provide a base for supporting the bottoms of the glasses or bottles inserted in the openings 9. I also provide a vertical brace 14 affixed to the underside of table 7 and to the upper side of sub-base 13 for rigidly fastening these members together. Suitable paper or other covers C may be provided for the containers 10, 11 and 12.

In using the device, the attachment may be placed on the serving tray with the recessed portions 6 of the legs 5 engaged on opposite portion of the rim 2 of the serving tray, as shown in Fig. 2. The attachment may be readily removed by a slight pull away from the tray. Glasses of water or bottled drinks may be placed in the apertures 9. This attachment makes it possible for the waitress to carry in one trip all necessary glasses of water, bottles, barbecue sauce, mustard, or other condiments to the customer waiting at the curb, thus saving extra trips to bring the various articles served.

What I claim is:

In an attachment for serving trays, the combination of a table member having a series of apertures of different sizes including several apertures of like size for holding glasses, and larger and smaller apertures at the ends of the table member for holding cups of condiments or the like, opposite spaced legs affixed to the under side of the table member, said legs having recessed portions adapted to releasably engage the rim of a standard serving tray, a sub-base extending between and connected to the respective legs and functioning both as a support for glasses inserted in the apertures in the table member and as a brace for the legs, substantially as shown.

LEMUEL L. LASSITER.